*INVENTOR.*
WADSWORTH W. MOUNT
BY R. J. Dearborn

ATTORNEY.

June 7, 1955 W. W. MOUNT 2,709,889
GAS TURBINE USING REVOLVING RAM JET BURNERS
Filed June 22, 1951 3 Sheets-Sheet 2
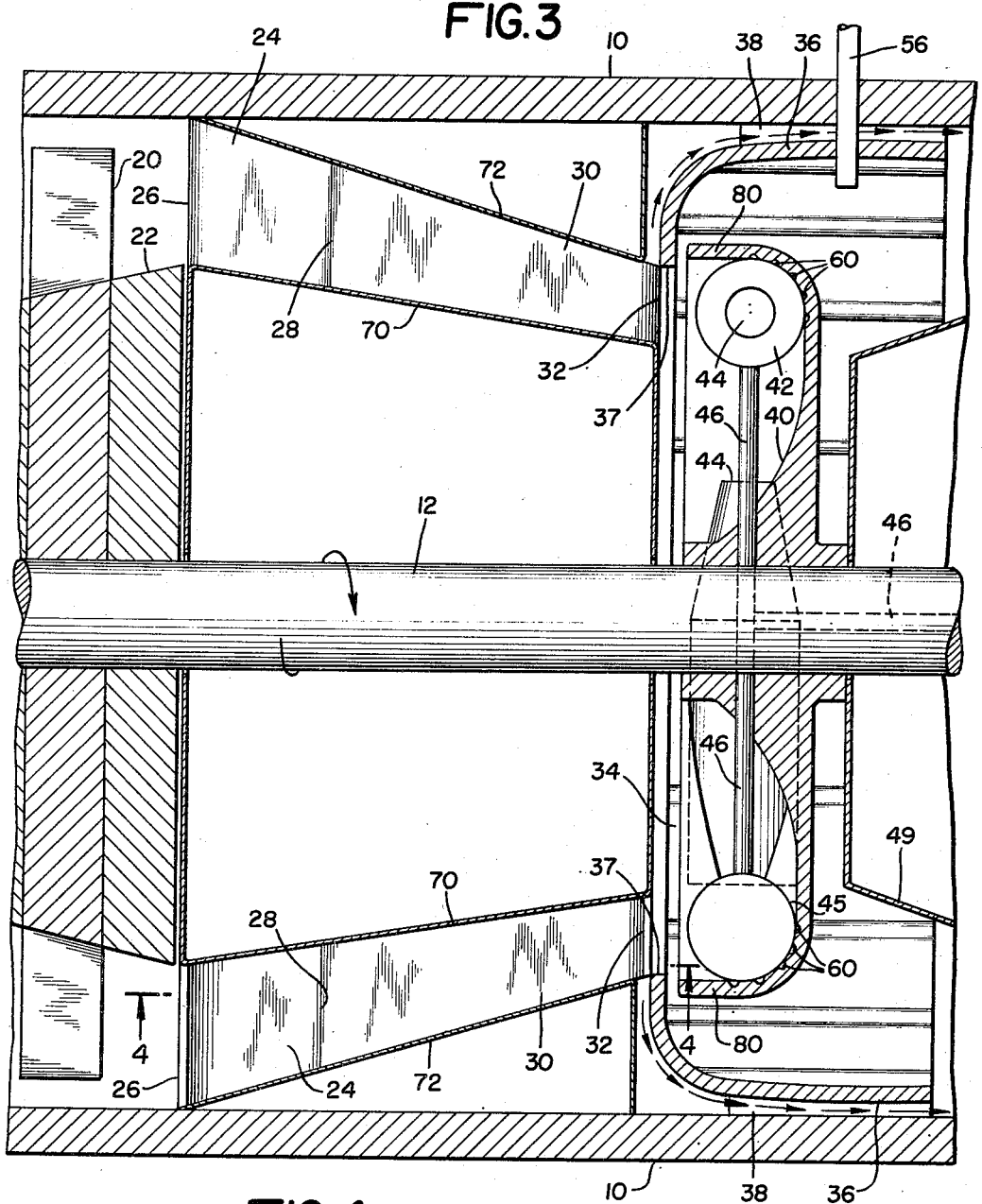
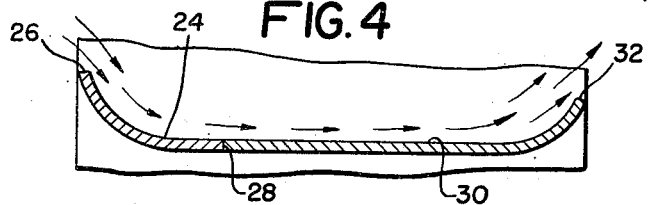
INVENTOR.
WADSWORTH W. MOUNT
BY R. J. Dearborn
ATTORNEY.

June 7, 1955 W. W. MOUNT 2,709,889
GAS TURBINE USING REVOLVING RAM JET BURNERS
Filed June 22, 1951 3 Sheets-Sheet 3

INVENTOR.
WADSWORTH W. MOUNT
BY R. J. Dearborn
ATTORNEY.

United States Patent Office 2,709,889
Patented June 7, 1955

2,709,889

GAS TURBINE USING REVOLVING RAM JET BURNERS

Wadsworth W. Mount, Summit, N. J.

Application June 22, 1951, Serial No. 232,946

19 Claims. (Cl. 60—35.6)

This invention pertains to a power plant, and more specifically relates to an aircraft gas turbine in which a rotating, torque-producing ram-jet power-generating wheel is substituted for stationary combustion chambers, of either the "can" or the annular type. Such stationary combustion chambers are well-known, and their use is standard practice. The invention may also be used in stationary gas turbines.

In my copending application, Serial No. 106,126, filed July 22, 1949, I have disclosed a power plant in which a ram-jet power-generating wheel is compounded with a steam generating system. In the present application, which is related to said copending application, I disclose a ram-jet power-generating wheel compounded with the compressor and turbine system of a standard aircraft gas turbine.

A standard aircraft gas turbine consists of three basic components, as follows: an air compressor (centrifugal or axial); a series of combustion chambers, either the "can" or the annular type; and a turbine, the shaft of which is connected to the compressor. The compressor compresses air to perhaps four atmospheres. At high air speeds, the ramming effect due to the speed of the plane may add a fifth atmosphere. From the compressor, the air enters the stationary combustion chambers where it is mixed with fuel, and combustion occurs. Fuel is injected into the combustion chambers under high pressure in a continuous stream through fuel nozzles. The fuel mixes with a portion of the air and burns continuously. Subsequently the resulting flame mixes with the remainder of the air to reduce the flame temperature (about 3700° F.) to a temperature permitted by available materials. The overall air-fuel ratio averages about 60 to 1, whereas complete combustion requires an air-fuel ratio of only about 16 to 1. The excess is necessary cooling air. The hot gases, at about 1500° F., after leaving the combustion chambers, then pass through the turbine blades.

In a standard turbojet engine, the turbine uses just enough energy from the hot gases to run the air compressor (plus accessories), and the balance is used to create a high gas velocity from the tail cone to produce thrust. The temperature of the gases leaving the tail cone is usually about 1100° F., and the velocity is about 1200 miles per hour. The amount of power needed to operate the compressor is very considerable. As a matter of fact, the compressor normally uses up ⅔ or ¾ of the total engine power.

In a standard propjet engine, a larger proportion of the energy is converted into mechanical power, some of which is transmitted through a gear train to a propeller.

This invention employs a rotating wheel mounted upon the main shaft of the engine and having ram-jet motors spaced around its periphery and does not use the standard stationary combustion chambers. There follows a brief description of the structure.

Axially mounted in a substantially cylindrical casing is a main shaft. An air compressor is mounted upon the shaft toward the forward end of the casing. A revolving wheel is mounted upon the shaft back of the compressor, and the wheel has suitable ram-jet motors positioned around its periphery. Suitable means, such as vanes for directing the compressed air into the intake ends or mouths of the ram-jet motors are positioned between the compressor and the revolving wheel. A deflecting ring, the cross-section of which is approximately a quarter of a circle, closely surrounds the revolving wheel, for the purpose of deflecting the exhaust from the ram-jets to an axial direction. The ram-jet exhaust then passes through a turbine which may be standard and which drives the air compressor. As will appear more clearly hereinafter, the turbine may be omitted completely under some circumstances. From the turbine, the gases pass a tail cone and leave the casing at high velocity. An after-burner may be provided, if desired.

A power plant constructed in accordance with this invention has many advantages over a power plant having stationary combustion chambers, and the attainment of said advantages are important objects of the invention.

Fewer compressor stages are needed, since much of the needed compression ratio is built up in the ram-jet motors themselves.

Turbine inlet temperatures of around 1500° F. can be maintained with less excess cooling air, inasmuch as the ram-jet motors convert much of the heat of combustion directly to energy of motion.

The invention obtains higher air intake speeds by jetting high speed air from the compressor into the mouths of the rotating ram-jets, so that the total air speed is higher than the peripheral speed of the motors alone.

To the degree that the ram-jet motors convert heat directly to torque, greater efficiency will result, because proportionately less excess cooling air has to be pumped through the system.

By proper design, it is possible to eliminate the turbine altogether, and also to increase the permissible temperature of the mass flow by using the ram-jet motors alone to turn the compressor shaft.

Since the fuel may be fed to each ram-jet combustion chamber through the main shaft, centrifugal force provides ample fuel pressure without the need of separate fuel pumps.

My invention is considerably less expensive to construct than a standard unit due to the fact that fewer compressor stages are needed. Furthermore, the fact that fewer compressor stages are needed greatly reduces the total weight of the unit, and this is an extremely important consideration in aircraft design.

As is well-known, efficient conversion of the heat energy of the fuel to useful thrust energy requires that the process occur with highest possible air compression. While compression ratios can be raised in gas turbines by increasing the number of stages of the compressor, it is very costly to do so. Ram-jets, properly designed, have their compression ratio increased in relation to the speed at which the air enters their intakes.

A compression ratio of 5 to 1, readily obtainable in a turbojet engine, is attained by a ram-jet at an air intake speed of about 1200 miles per hour or 1700 feet per second. A ram-jet compression ratio of 7.6 atmospheres is theoretically reached at an air intake speed of around 1400 miles per hour or 2000 feet per second. A ram-jet power generating wheel which would have a peripheral speed of 1000 feet per second can be built. It is possible greatly to increase the air intake speed by jetting the high speed air into the turning ram-jets so that the effective air intake speed approximates the sum of the peripheral speed and the induced air speed. To get air to travel through nozzles at 1000 feet per second requires that the air be compressed to only about 1.84 atmospheres. If this air is directed by vanes against the ram-jet mouths, and if the peripheral speed of the ram-jet is 1000 feet per second, the effective air intake speed would be close to 2000 feet per second. This combination of peripheral speed and initially compressed air greatly increases the compression ratio within the ram-jet burners and materially reduces the amount of excess air needed for cooling purposes alone.

If the compressor delivers air at 3.1 atmospheres, the air could be nozzled to a speed of about 2000 feet per second. This means that when such air is introduced into the ram-jet burners travelling at a peripheral speed of 1000 feet per second, the result is an effective air intake speed of about 3000 feet per second. The resulting compression ratio in the ram-jet motors provides enough torque to drive the compressor without the use of turbine blades at all. In such an operation, the total exhaust heat from the ram-jet motors which leaves the burners at about 3700° F. and at a velocity of about 3000 feet per second, first provides a forward thrust by being turned 90° from a substantially tangential direction to an axial direction by the deflecting ring, and then provides its main thrust as the hot gases are accelerated directly past the tail cone. Added thrust may be obtained by adding heat in a conventional afterburner to use the excess cooling air.

The above and other objects and advantages will appear more clearly from the following description taken with the accompanying drawings in which:

Fig. 3 is an enlarged sectional view taken on line 3—3 of Fig. 1;

Fig. 4 is a sectional view taken on line 4—4 of Fig. 3;

Like reference characters denote like parts in the various views.

Figure 1:
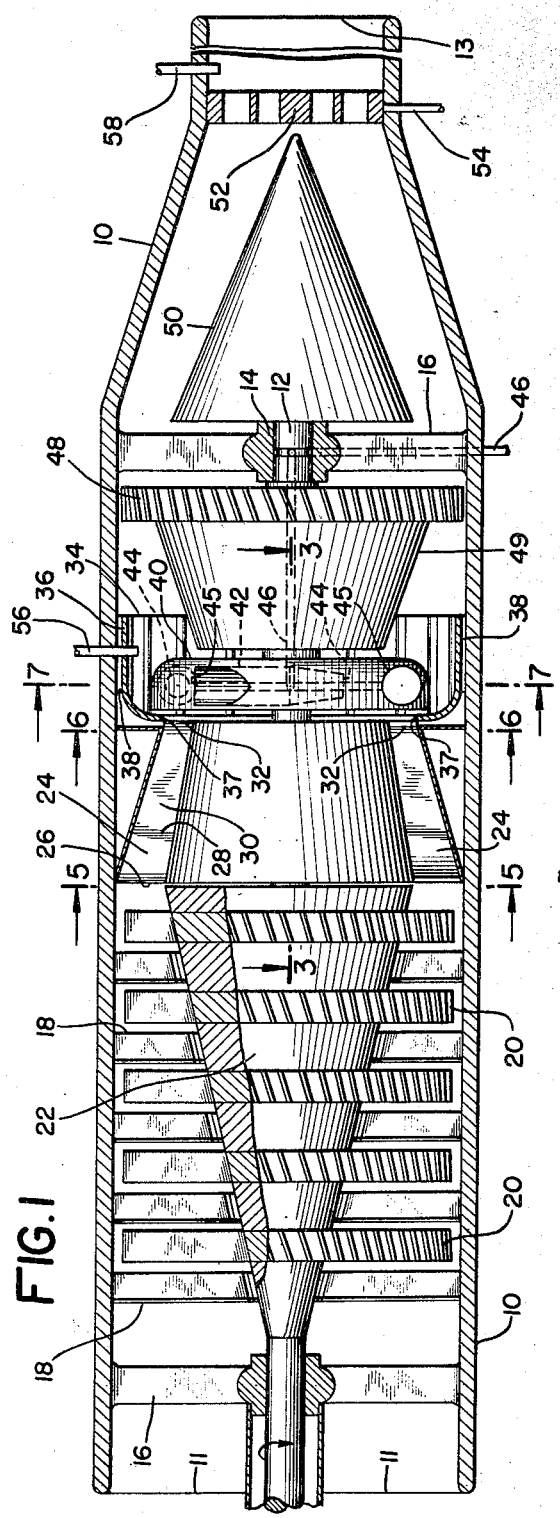
Fig. 1 is a view, partially in section, of the entire power plant including air compressor, air straightener and deflector vanes, ram-jet power-generating wheel, deflecting ring, turbine, tail cone, and after-burner.

The construction of a preferred form of power plant will first be described with reference to Fig. 1. The power plant includes a substantially cylindrical, open-ended casing 10, having intake and exhaust ends 11 and 13, respectively. The casing 10 is tapered to a smaller diameter near the exhaust end 13. A main shaft 12 is axially mounted within the casing 10 in suitable bearings 14 carried by supports 16. The casing 10 is open at the left or intake end freely to admit incoming air (including excess cooling air) thereto.

Near the intake end 11 of the casing 10 is an axial type air compressor of the usual multi-stage sort. The compressor includes stators 18 mounted on the inside of the casing, and rotors 20 keyed or otherwise affixed to a built-up conical portion 22 of the shaft 12, thus progressively reducing the cross-sectional air flow area through the compressor. It will be assumed throughout that the shaft 12 rotates in a clockwise direction when viewed from the intake end 11 of the power plant, and that any reference to rotational direction will be as seen from the intake end 11. Hence the compressed air as it leaves the compressor tends to rotate also in a clockwise direction. The whirling air which has now been compressed to several atmospheres pressure, is next straightened into approximately an axial direction of flow by a plurality of straightening vanes 24 (Figs. 1, 3, 4 and 5) having inlet and outlet ends 26 and 28, respectively. The inlet ends are inclined to catch the air from the last stage of the air compressor. The outlet ends point in a direction parallel to the main shaft 12.

For purposes which will appear more clearly hereafter, the air is next deflected by a plurality of deflectors 30 (Figs. 1, 3 and 4), which may conveniently be continuations of the outlet ends 28 of the straightening vanes 24, and which have discharge ends 32 which impart a counter-swirling motion to the air. That is, the deflectors 30 cause the air to rotate in a counterclockwise direction. Each vane 24 has a corresponding deflector 30, and it should be appreciated that, if desired, the vanes 24 may be made integral with their corresponding deflectors 30.

A power-generating wheel 40 is mounted upon the shaft 12, and the wheel 40 carries one or more ram-jet motors or burners 42 positioned about and substantially tangential to its periphery. Four evenly-spaced motors or burners 42 are illustrated. Each motor or burner 42 is generally cylindrical in shape and has a mouth 44 and an exhaust end 45. The mouth 44 is smaller than the exhaust end 45, as is conventional with a simple type of ram-jet burner such as that illustrated. The mouths of the motors 42 face in the direction of rotation of the shaft 12, and the deflectors 30 are designed to throw the air as directly as possible into the mouths 44 of the motors 42.

Fuel is injected into the motors 42 through a fuel line 46 which may conveniently run through one of the supports 16 to the center of the shaft 12, thence through the shaft to the center of the wheel 40, and thence to the motors 42, where the fuel mixes with the air and combustion continuously takes place. The thrust thereby developed creates and maintains a clockwise torque upon the shaft 12.

Thus it will be seen that the motors 42 drive the wheel 40 and the main shaft 12 in a clockwise direction.

The still-burning exhaust (at about 3700° F.) from the motors 42 travels initially in a plane perpendicular to the shaft 12. A deflecting ring 34 having a cylindrical side 36 and a lip 37 is positioned around the wheel 40 and is supported as at 38, leaving a small clearance between the ring 34 and the casing 10. The exhaust from the motors 42 will strike under the lip 37 and flow along the cylindrical side 36 of the ring 34, thus deflecting the air once more to a substantially axial direction. At the same time, forward thrust is created.

The hot combustion gases next encounter the blades of a conventional turbine 48 mounted upon the shaft 12, the blades being inclined to drive the turbine in the direction of rotation of the shaft 12. A truncated conical baffle 49 which may or may not rotate with the turbine 48, directs the gases into the turbine blades. The turbine exhaust is next passed over a tail cone 50 of the usual sort, and the unburned excess cooling air may be conveniently used to develop additional thrust in a conventional after-burner 52 to which fuel is fed through a fuel line 54 after which the mass flow exhausts to the atmosphere, its mass and velocity providing the main source of thrust.

Spark plugs 56 and 58 are provided to ignite the fuel initially in the ring 34 and the after-burner 52, respectively. After combustion is started, the plugs 56 and 58 do not need to operate.

Sufficient space is provided between the discharge ends 32 of the deflectors 30 and the ring 34 to permit necessary cooling air to pass around the outside of the ring 34. Furthermore, the wheel 40 is provided with corrugations 60 adjacent the motors 42 to allow sufficient air to pass around the outside of the motors 42 to cool them. The air which cools the ring 34 and the motors 42 also serves to reduce the 3700° F. temperature of the gases exhausted by the motors 42 to a temperature (about 1500° F.) which the turbine 48 can withstand. More detailed cooling ducts that will be necessary are not shown.

Figure 2:
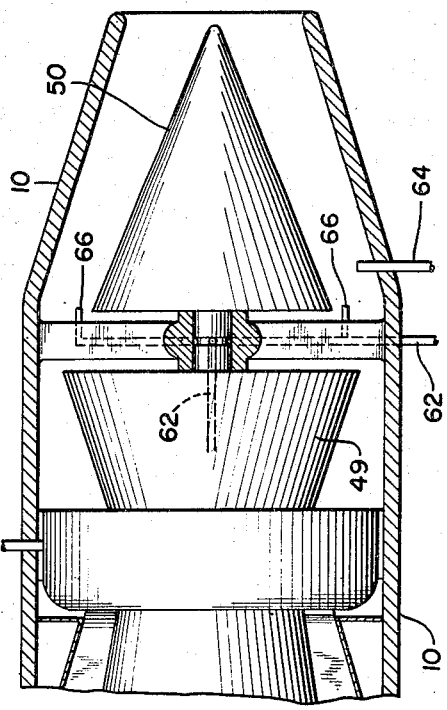
Fig. 2 is a view, partially in section, of the exhaust end of a modified power plant in which the turbine has been omitted.

Assuming that enough thrust and torque are developed in and by the motors 42 to turn the shaft 12 fast enough to drive the compressor, it will be possible to eliminate the expensive turbine 48 altogether. In such event, the modified structure could conveniently be as shown in Fig. 2, which shows the exhaust end of the power plant with no turbine. In this modification, there is provided simply a fuel line 62 through which fuel is fed to the motors 42 as described above, and which also feeds fuel through nozzles 66 into the interior of the casing 10 near the large end of the tail cone 50. A spark plug 64 is positioned initially to ignite fuel from line 62 at this point, thus providing an after-burner to burn excess air and provide additional thrust when needed. Where the turbine is omitted, the amount of excess cooling air can be greatly reduced, since there is no turbine which must be cooled. In this case, a much higher exhaust velocity is obtained due to the higher mass acceleration resulting from the higher operating temperature.

Furthermore, as stated above, a power plant built upon the ram-jet power-generating wheel principle requires less compressor stages than does one using conventional stationary burners. One reason is that turbine (where one is used) inlet temperatures of 1500° F. can be maintained with less excess cooling air, inasmuch as the ram-jet motors convert much of the heat of combustion directly into thrust. Higher temperature means greater velocity of mass flow, a greater temperature drop within the system, and therefore provides more work per pound of fuel.

The invention, also as stated above, attains higher air intake speeds by jetting high speed compressed air into the mouths of rotating burners, instead of into stationary ones. This increases the compression ratio.

I shall now describe in greater detail the structure of the straightening vanes 24, the deflectors 30, the ring 34, the wheel 40 and the motors 42.

Figure 5:
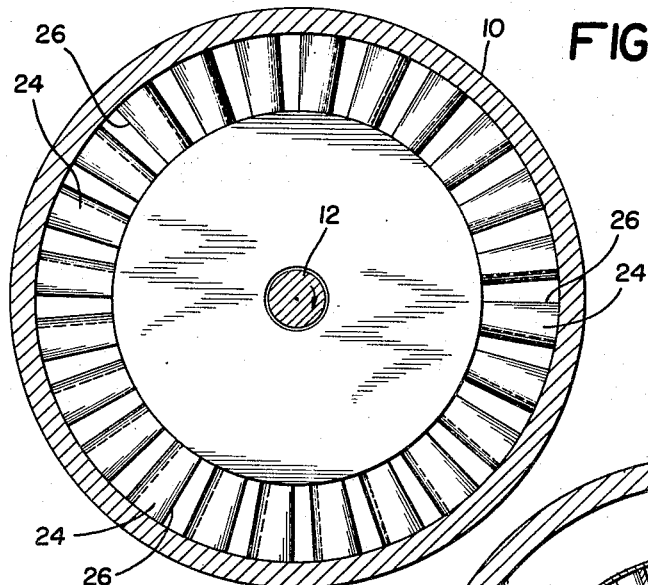
Fig. 5 is an enlarged sectional view taken on line 5—5 of Fig. 1.

The compressor discharges swirling air in a clockwise direction near the casing 10 (Fig. 3) into the straightening vanes 24, of which twenty-four are shown spaced in a circle around the inside of the casing 10 (Fig. 5). The forward edge 26 of each straightener 24 is directed toward the oncoming air, which is thus picked up by the straightener 24. In cross-section (Fig. 4) each straightener is substantially arcuate and as illustrated looks like about a quarter of a circle. The outlet end 28 of each straightener 24 points in the direction of the shaft 12 and therefore leaves the air leaves the straighteners 24 flowing axially.

Figure 6:
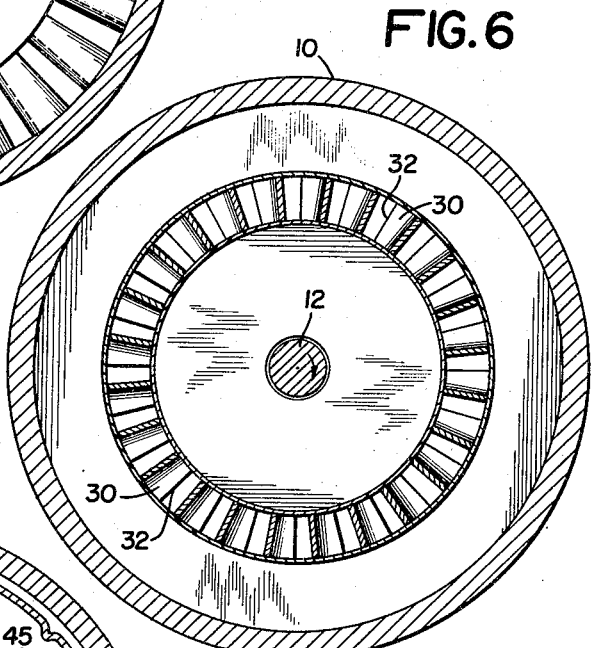
Fig. 6 is an enlarged sectional view taken on line 6—6 of Fig. 1.

Abutted against the outlet end 28 of each straightener 24 is the intake end of one of the deflectors 30. Each deflector 30 continues along axially a short distance (Fig. 4) and then turns near its discharge end 32 to discharge the air in a counter-clockwise direction into the mouths of the motors 42. Like the straighteners 24, the deflectors 30 are arranged in a circle (Fig. 6), but spaced inward from the casing 10, so as to be as near as possible to the mouths 44 of the motors 42.

The straighteners 24 and the deflectors 30 are stationary with relation to the casing 10.

A stationary duct bounded by walls 70 and 72 (Fig. 3) is provided to cause the air to follow the contour of the straighteners 24 and the deflectors 30.

In addition to being inclined inwardly toward the motors 42, the straighteners 24 and the deflectors 30 are preferably also tapered, so that the intake ends 26 of the straighteners 24 are considerably wider than the discharge ends 32 of the deflectors 30. This produces a nozzle effect which further increases the speed of air flow into the mouths 44 of the motors 42.

Figure 7:
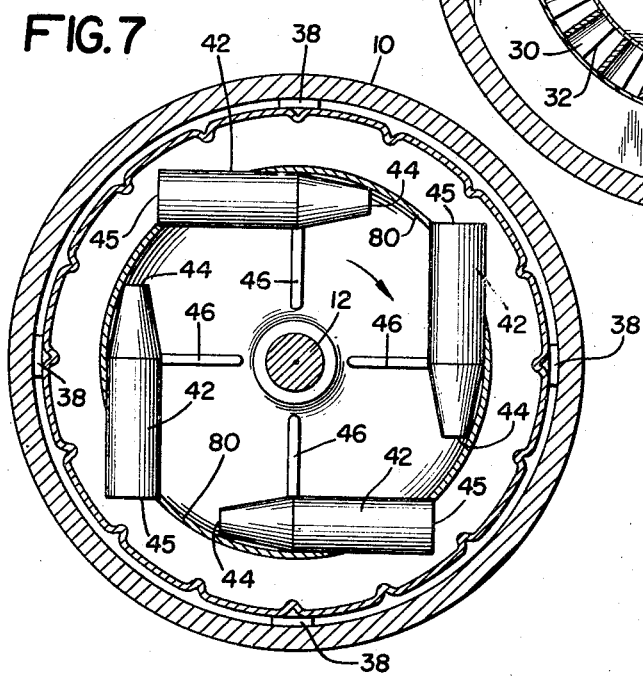
Fig. 7 is an enlarged sectional view taken on line 7—7 of Fig. 1.

The wheel 40 is rigidly mounted on the shaft 12, so that they turn together. In general, the wheel 40 has a cup-shaped periphery 80 with its open end facing the deflectors 30 (Fig. 3). The motors 42 are disposed to nestle in the wheel 40 at its periphery 80 and to lie with their mouths 44 just within, and their discharge ends 45 just without, the periphery 80 (Fig. 7). Corrugations 60 permit cool air to pass over the outsides of the motors 42 to prevent them from overheating. The motors 42 lie in a plane perpendicular to the shaft 12.

In operation, air enters the compressor, is thrown through the straighteners 24, the deflectors 30 and into the ram-jets 42, which may have a clockwise peripheral speed of 1000 feet per second, for example.

Fuel enters the motors 42 through the lines 46 and is ignited. Combustion starts within the motors 42 and continues in the space defined roughly by the outside of the periphery 80 of the wheel 40, the cylindrical side 36 of the ring 34, the conical surface of the baffle 49 and the forward edge of the turbine 48. The thrust developed by the velocity of said combustion gases out of the ram-jets and through the turbine blades produces torque which turns the shaft 12 and drives the compressor.

Some air does not pass through the motors 42, but instead goes from the discharge ends 32 of the deflectors 30 around the outside of the ring 34 as shown by the arrows (Fig. 3), and some slips past the mouths 44 of the motors 42 and goes through the corrugations 60. This is all necessary cooling air. A small amount also spills over the forward edge of the wheel 40 and under the lip 37 of the ring 34.

Many modifications, substitutions and equivalents will be apparent to those skilled in the art, and I do not limit myself to the details hereinabove set forth except as defined by the following claims.

Having thus described my invention, I claim:

1. A power plant comprising a power output shaft, an air compressor mounted on said shaft, a power-generating wheel for rotating said shaft and driving said compressor, at least one ram-jet motor mounted on the periphery of said wheel and which is adapted to discharge its exhaust in a plane perpendicular to said shaft, said motor comprising a relatively large open mouth at the leading edge thereof, a divergent diffusion section, a substantially constant cross-sectional area combustion chamber and an exhaust at the trailing edge thereof, and means for deflecting said exhaust to an axial direction to provide forward thrust.

2. A power plant comprising a casing, a power output shaft within said casing, an air compressor mounted on said shaft, a power-generating wheel for rotating said shaft and driving said compressor, at least one ram-jet motor mounted on the periphery of said wheel and which is adapted to discharge its exhaust in a plane perpendicular to said shaft, said motor comprising a relatively large open mouth at the leading edge thereof, a divergent diffusion section, a substantially constant cross-sectional area combustion chamber and an exhaust at the trailing edge thereof, and means for deflecting said exhaust to an axial direction to provide forward thrust.

3. A power plant comprising a power output shaft, an air compressor mounted on said shaft, a power-generating wheel for rotating said shaft, at least one ram-jet motor mounted on the periphery of said wheel, said motor comprising a relatively large open mouth at the leading edge thereof, a divergent diffusion section, a substantially constant cross-sectional area combustion chamber and an exhaust at the trailing edge thereof, a turbine driven by the exhaust from said motor for operating said compressor, and means for directing said exhaust into said turbine.

4. A power plant comprising a casing, a power output shaft within said casing, front and rear supports for said shaft, an air compressor mounted on said shaft, a power-generating wheel for rotating said shaft, at least one outwardly discharging ram-jet motor mounted on the periphery of said wheel, said motor comprising a relatively large open mouth at the leading edge thereof, a divergent diffusion section, a substantially constant cross-sectional area combustion chamber and an exhaust at the trailing edge thereof, means between said compressor and said wheel for directing air from said compressor into the mouth of said ram-jet motor, and means to duct the high temperature and high velocity gases exhausted from said motor rearwardly to provide forward thrust.

5. A power plant comprising a casing, a power output shaft within said casing, front and rear supports for said shaft, an air compressor mounted on said shaft, a power-generating wheel for rotating said shaft, at least one outwardly-discharging ram-jet motor mounted on the periphery of said wheel, said motor comprising a relatively large open mouth at the leading edge thereof, a divergent diffusion section, a substantially constant cross-sectional area combustion chamber and an exhaust at the trailing edge thereof, means between said compressor and said wheel for directing air from said compressor into the mouth of said ram-jet motor, and a deflector ring carried by said casing against which the exhaust from said motor impinges and which deflects said exhaust to substantially an axial direction to provide forward thrust.

6. The invention set forth in claim 5 wherein said deflector ring is cooled by excess air passing from said compressor around said ring.

7. The invention set forth in claim 5 wherein said means for directing air from said compressor into the mouth of said motor include a plurality of vanes to straighten the air flow to an axial direction, and a plurality of deflector vanes, one corresponding to each said straightening vane, to direct the air substantially directly into said mouth.

8. The invention set forth in claim 5 wherein said means for directing air from said compressor into the mouth of said motor include a plurality of vanes to straighten said air flow to an axial direction and then to deflect said air into said mouth, said vanes being of diminishing cross-sectional area away from said compressor to provide a nozzle effect and further increase the speed of air flow into said motor.

9. A power plant comprising a casing, a shaft within said casing, front and rear supports for said shaft, an air compressor mounted on said shaft, a power-generating wheel for rotating said shaft, at least one outwardly-discharging ram-jet motor mounted on the periphery of said wheel, said motor comprising a relatively large open mouth at the leading edge thereof, a divergent diffusion section, a substantially constant cross-sectional area combustion chamber and an exhaust at the trailing edge thereof, means between said compresssor and said wheel for directing air from said compressor into the mouth of said ram-jet motor, a deflector ring against which the exhaust from said motor impinges and which deflects said exhaust to substantially an axial direction, and a turbine driven by said exhaust.

10. The invention set forth in claim 9 wherein said deflector ring is cooled by excess air passing from said compressor around said ring.

11. The invention set forth in claim 9 wherein said means for directing air from said compressor into the mouth of said motor include a plurality of vanes to straighten said air flow to an axial direction and then to deflect said air into said mouth, said vanes being of diminishing cross-sectional area away from said compressor to provide a nozzle effect and further increase the speed of air flow into said motor.

12. The invention set forth in claim 9 wherein said means for directing air from said compressor into the mouth of said motor include a plurality of vanes to straighten said air flow to an axial direction and a plurality of deflector vanes, one corresponding to each said straightening vane, to direct the air substantially directly into said mouth.

13. The invention set forth in claim 9 wherein an after-burner is provided to use up excess air.

14. A power plant comprising a substantially cylindrical casing, a shaft axially mounted in said casing, an air compressor mounted on said shaft, a cup-shaped power-generating wheel mounted on and perpendicular to said shaft for driving said compressor by torque and having its open end facing the exhaust end of said compressor, at least one ram-jet motor having a mouth and an exhaust end, said motor being nestled against the periphery of said wheel substantially tangential thereto and having its mouth within and its exhaust end without said periphery, means between said compressor and said motor for directing a large portion of air from said compressor substantially directly into the mouth of said motor, said means including air straightening and deflecting vanes, a deflecting ring closely surrounding said wheel for directing the hot products of combustion from said motor from a transverse to an axial direction, to augment forward thrust, and means for passing cooling air past the outside of said ring and past the outside of said motor.

15. The invention set forth in claim 14 wherein an after-burner is provided for using up excess air and providing additional forward thrust.

16. The invention set forth in claim 14 wherein a turbine is provided in the path of the axial exhaust from said deflector ring.

17. The invention set forth in claim 16 wherein an after-burner is provided for using up excess air and providing additional forward thrust.

18. A power plant comprising a power output shaft, a power-generating wheel mounted on said shaft, at least one ram-jet motor tangentially mounted on said wheel for producing torque on said shaft and for discharging a flame of hot exhaust gases, said motor comprising a relatively large open mouth at the leading edge thereof, a divergent diffusion section, a substantially constant cross-sectional area combustion chamber and an exhaust at the trailing edge thereof, an air compressor mounted on said shaft and driven by said torque for jetting high-speed air into said motor, and means for directing said exhaust to an axial direction.

19. A power plant comprising a power output shaft, a power generating wheel mounted on said shaft, at least one ram-jet type thrust producing motor having a relatively large open mouth at the leading edge thereof, a divergent diffusion section, a substantially constant cross-sectional area combustion chamber and an exhaust end, said motor being mounted at the periphery of said wheel for producing torque on said shaft, a compressor mounted on said shaft, stationary duct means for directing air from said compressor into the mouth of said motor, means for separating the intake to said motor from the exhaust therefrom, and deflector means for deflecting the exhaust from said motor to an axial direction relative to said shaft.

References Cited in the file of this patent

UNITED STATES PATENTS

| | | |
|---|---|---|
| 1,146,707 | Holtz | July 13, 1915 |
| 1,945,608 | Hill | Feb. 6, 1934 |
| 2,188,128 | Armstrong | Jan. 23, 1940 |
| 2,448,972 | Gizara | Sept. 7, 1948 |
| 2,516,910 | Redding | Aug. 1, 1950 |
| 2,523,655 | Goddard | Sept. 26, 1950 |
| 2,565,854 | Johnstone et al. | Aug. 28, 1951 |
| 2,572,723 | Hildestad | Oct. 23, 1951 |
| 2,579,049 | Price | Dec. 18, 1951 |
| 2,592,938 | McNaught | Apr. 15, 1952 |